(12) United States Patent
De Block

(10) Patent No.: US 6,553,607 B1
(45) Date of Patent: Apr. 29, 2003

(54) WIPER DEVICE FOR MOTOR VEHICLE WINDOWS

(75) Inventor: Peter De Block, Halen (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/744,481

(22) PCT Filed: May 5, 2000

(86) PCT No.: PCT/DE00/01424

§ 371 (c)(1), (2), (4) Date: Apr. 5, 2001

(87) PCT Pub. No.: WO00/73113

PCT Pub. Date: Dec. 7, 2000

(30) Foreign Application Priority Data

May 28, 1999 (DE) .......................... 199 24 662

(51) Int. Cl.⁷ .............................. B60S 1/40; B60S 1/38
(52) U.S. Cl. .................................. 15/250.32; 15/250.43
(58) Field of Search ....................... 15/250.32, 250.351, 15/250.44, 250.43, 250.361

(56) References Cited

U.S. PATENT DOCUMENTS

| | | | | |
|---|---|---|---|---|
| 2,974,341 A | * | 3/1961 | Hart | 15/250.32 |
| 3,641,614 A | * | 2/1972 | Newsome | 15/250.32 |
| 4,132,490 A | | 1/1979 | Journee | 15/250.32 |
| 4,300,259 A | * | 11/1981 | Maiocco | 15/250.32 |
| 4,416,032 A | * | 11/1983 | Mohnach et al. | 15/250.32 |
| 4,980,944 A | | 1/1991 | Longman | 15/250.32 |

FOREIGN PATENT DOCUMENTS

| | | |
|---|---|---|
| DE | 1 505 397 | 10/1969 |
| DE | 1 655 410 | 8/1971 |
| DE | 26 40 399 | 3/1977 |

* cited by examiner

Primary Examiner—Gary K. Graham
(74) Attorney, Agent, or Firm—Michael J. Striker

(57) ABSTRACT

A wiper apparatus for motor vehicle windshields is proposed, said apparatus being provided with a driven wiper arm located on the motor vehicle body and movable between reversing positions, on whose free end is fixed one side of a joint pin whose axis extends transverse to the longitudinal axis of the wiper arm and essentially in the direction of movement of the wiper arm. On the joint pin is lodged a wiper blade capable of swinging about the joint axis, the wiper apparatus having means for securing the wiper blade on the joint pin. A particularly cost-effective wiper apparatus is obtained when the securing means for the wiper blade are disposed on the wiper arm and on the side of the wiper blade facing away from said arm cooperate with a stop located on the wiper blade side.

14 Claims, 4 Drawing Sheets

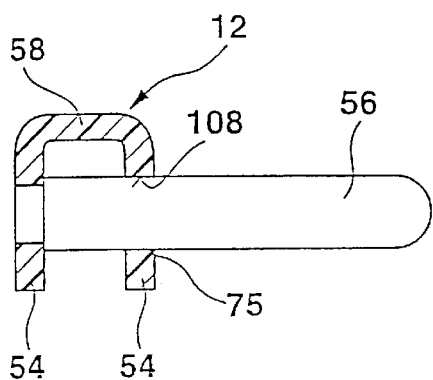
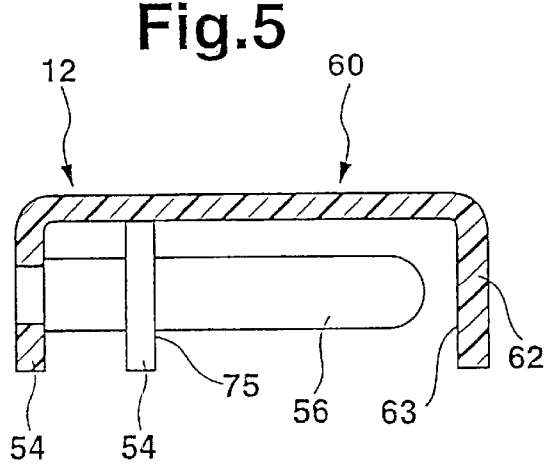
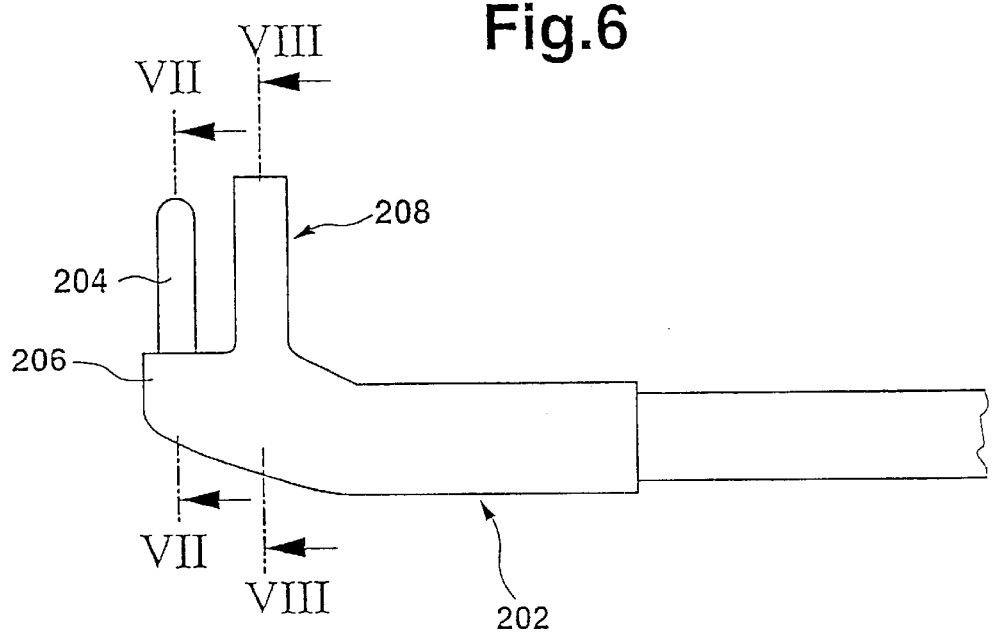
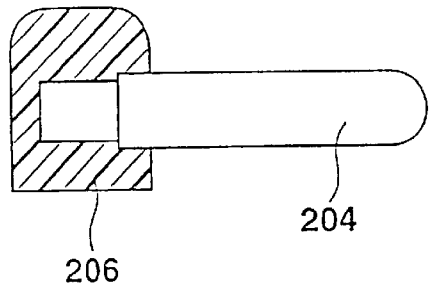
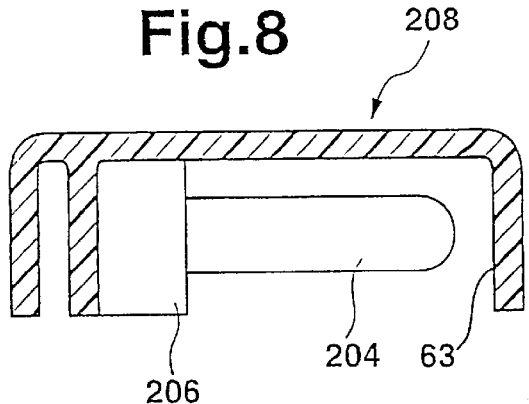

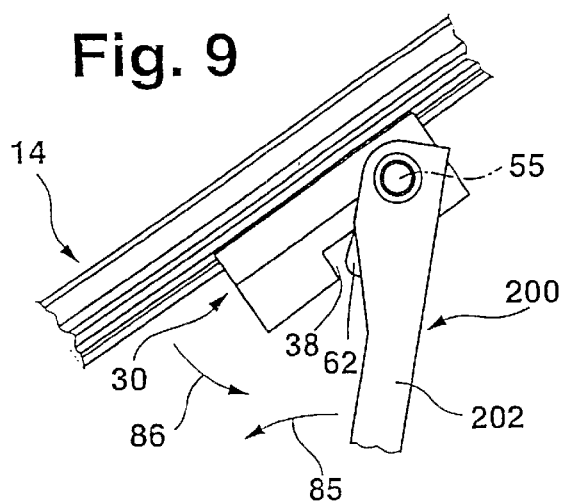
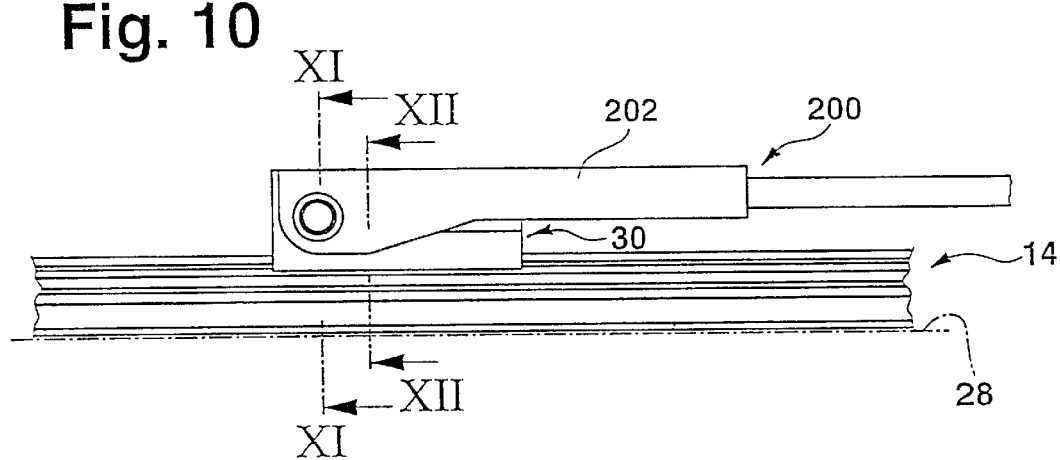
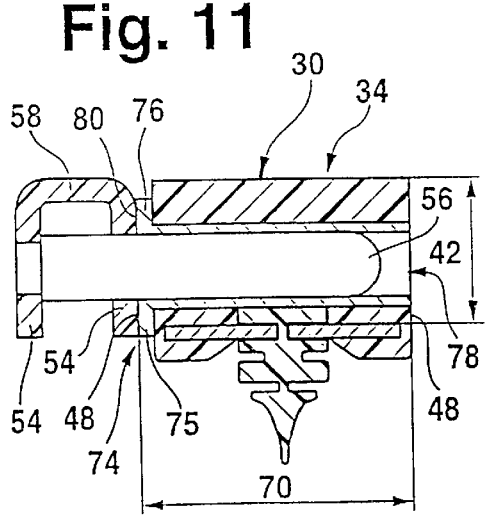
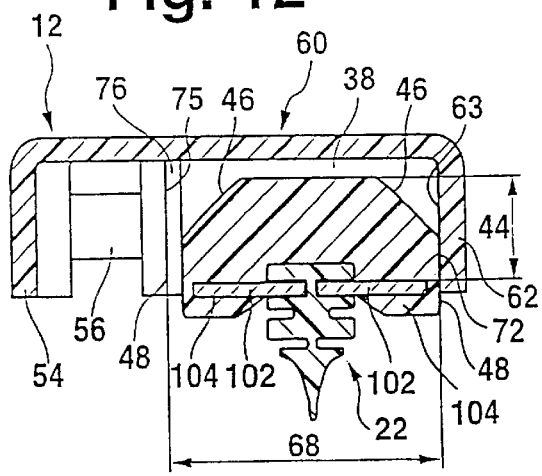

WIPER DEVICE FOR MOTOR VEHICLE WINDOWS

BACKGROUND OF THE INVENTION

The invention relates to a wiper apparatus. In a known wiper of this kind (DE 16 55 41 0 A1), the wiper arm and the wiper blade are disposed next to each other as viewed in the direction of the windshield to be wiped and one after the other as seen in the working direction of the wiper apparatus. In this manner, it is possible to achieve a lower overall height for the wiper apparatus than can be done for wipers in which the wiper arm is located over the wiper blade (DE 15 05 397 A1). The lower overall height of the wiper apparatus of this type is advantageous in terms of the lift-off of the wiper blade from the windshield, particularly at high travel velocities.

To ensure that the wiper blade is securely fastened by the joint pin during the wiping operation, in the known wiper arrangement the joint pin, which is disposed laterally on the wiper arm, is provided in its center portion with a ring groove into which, after the wiper blade is mounted on the joint pin, a leaf spring fits at one end, said leaf spring being capable of being deflected by a force and, together with the ring groove side walls, of securely fastening the wiper blade on the wiper arm. The arrangement and configuration of such securing means is cost-intensive because, on the one hand, the joint pin must be provided with a ring groove and, on the other, when the wiper blade is replaced, the new wiper blade must be provided with an appropriate leaf spring.

In another known wiper apparatus (DE 26 40 399 A1), the joint pin and the securing means formed by a hinged bracket are disposed on the same structural component of the wiper apparatus. Because this component is the wiper blade, however, when said blade has to be replaced, both the joint pin and the hinged bracket are lost.

SUMMARY OF THE INVENTION

In the wiper apparatus according to the invention, both the securing means and the joint pin are retained when the wiper blade is replaced. The securing means on the wiper blade side—namely the stop—can be formed by the corresponding side cheek of the wiper blade which is always present and which faces away from the wiper arm. This side cheek does not need to have a special configuration.

A wiper apparatus of particularly low design and thus flow-promoting is obtained when the wiper blade has a strip-shaped, elongated carrying element, made of an elastic material, for a wiping strip that comes in contact with the windshield to be wiped, on whose strip surface which faces away from the windshield is disposed a coupling part belonging to a connecting device and having a bearing recess for the joint pin.

In the configuration of the invention, the securing means of the wiper arm are formed by support regions which in the wiping direction are disposed at a distance from each other and are oriented toward each other, and between which are disposed matching regions of the wiper blade, said matching regions facing away from one another. A cost-effective realization of the inventive idea is attained in this manner.

A particularly robust and thus reliably operating wiper apparatus is obtained when one support region is disposed on a swiveling lever of the wiper arm and the swiveling lever has a shoulder which projects out in the direction of the joint axis and across the wiper blade and at the free end of which is disposed a leg facing the windshield, the side of said leg facing the swiveling lever forming the other support region.

To limit the length of the wiper blade to the required size, the distance from the free end of the wiper arm to the joint axis is smaller than the distance from the free end of the wiper arm to the shoulder.

According to a further development of the invention, viewed in the longitudinal direction the bearing bore is disposed in the coupling part near one end of the same and, furthermore, the coupling part is lower, at least in the region of the shoulder and relative to the carrying element, than in the region of the bearing bore. In other words, the shoulder can be located where the coupling part is lower so that, as a result of the arrangement of the shoulder in the transverse region, the overall height does not need to be increased. The stability of the coupling part in the region of the highly stressed bearing bore is thereby not impaired.

Advantageously, this low region of the coupling part is attained by providing said part in the region of the shoulder disposed on the wiper arm with a groove open at the top and facing away from the carrying element and in which the shoulder crosses the coupling part.

When the wiper arm together with the wiper blade must be moved away from the windshield, for example to replace the wiper blade, an uncontrolled separation of the wiper blade from the wiper arm can be prevented by making the distance, in the longitudinal direction of the wiper blade, from the bearing bore over the transverse groove to one end of the wiper blade greater than to the other end of the wiper blade. In this manner, because the center of gravity has been displaced, the half of the wiper blade lying next to the wiper arm is turned toward the shoulder so that the wiper blade comes to rest by itself between the leg of the shoulder and the wiper arm or the swiveling lever thereof where it is secured. Inadvertent separation of the wiper blade from the wiper arm is thus not possible, because for this to happen, the wiper blade would have to be turned toward the wiper arm so as to displace it from the securing region of the leg.

A particularly simple configuration of the matching regions of the wiper blade is obtained when said regions are formed on the two long sides of the coupling part that face one another.

To minimize lateral play between the wiper blade and the support regions of the wiper arm, the distance, measured in the direction of the joint axis, between the matching regions of the wiper blade is adapted to the distance between the support regions of the wiper arm, because in this manner the side walls of the groove absorb at least part of the forces acting on the wiper blade—forces that can arise, for example, as a result of uneven soiling of the windshield—and thus relieve the load from the joint pin or the bearing pin.

Facilitated guidance of the wiper blade and thus a particularly quiet wiping operation can be achieved when, measured in the longitudinal direction of the wiper blade, the width of the shoulder is adapted to the width of the groove.

For a wiper blade which at least in the region of the joint pin has a U-shaped cross-section, whose U-leg faces the windshield, the joint pin can be fastened in simple manner by making said pin pass through the U-leg in a recess in proximity to the wiper blade and fastening said pin on the other U-leg.

Advantages for the bearing position of the wiper apparatus can arise when a separate connecting piece is fastened at the free end of the wiper arm or swiveling lever, said connecting piece being provided with both the joint pin and the securing means for the wiper blade.

When the wiper arm or the swiveling lever thereof are in the form of an injection-molded part, the joint pin can be connected with the wiper blade or the swiveling lever in simple fashion by molding one of its ends to the wiper blade.

Other advantageous features and embodiments of the invention are indicated in the following description of the embodiment examples shown in the attached drawings.

BRIEF DESCRIPTION OF THE DRAWINGS

In the drawings,

FIG. 4 shows a section through the wiper blade of FIG. 3 along line IV—IV, appropriately turned;

FIG. 5 shows a section through the wiper arm of FIG. 3 along line V—V, appropriately turned;

FIG. 6 shows a top view of the injection-molded free end of a possible embodiment of the wiper arm;

FIG. 7 shows a section through the wiper arm of FIG. 6 along line VII—VII, appropriately turned;

FIG. 8 shows a section through the wiper arm of FIG. 6 along line VIII—VIII, appropriately turned;

FIG. 9 is a partial representation, not to scale, of the wiper arm connected with the wiper blade wherein the wiper arm together with the wiper blade is pushed into a mounting position away from the windshield;

FIG. 10 shows the arrangement of FIG. 9 in operating position;

FIG. 11 shows a magnified representation of a section through the wiper apparatus of FIG. 10 along line XI—XI, and FIG. 12 shows a magnified representation of a section through the wiper apparatus of FIG. 10 along line XII—XII.

DESCRIPTION OF THE PREFERRED EMBODIMENT

Figure 1:
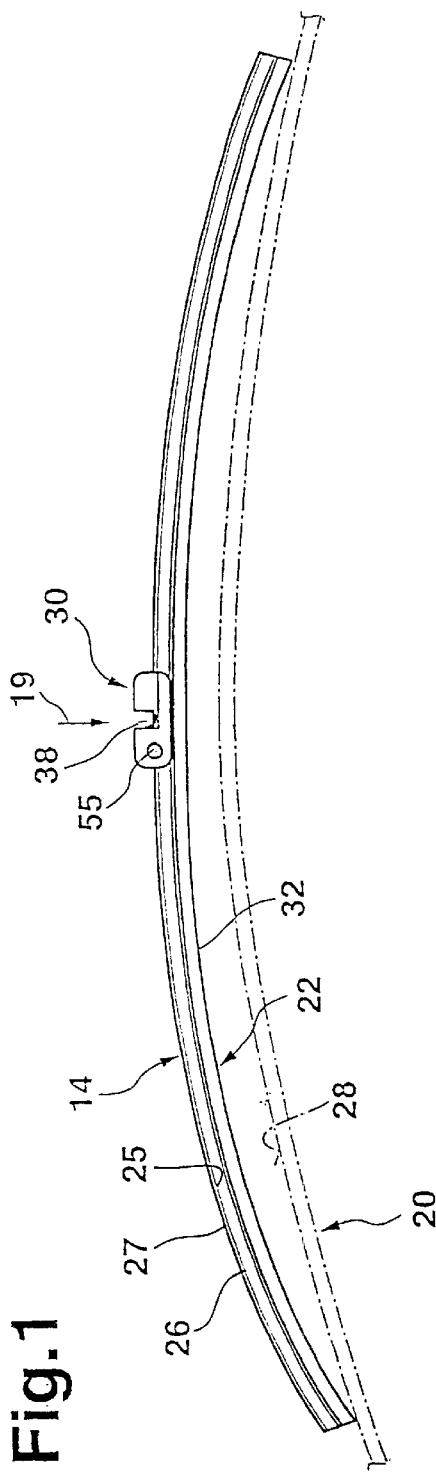
FIG. 1 shows a side view of the wiper blade belonging to the wiper apparatus of the invention.
Figure 2:
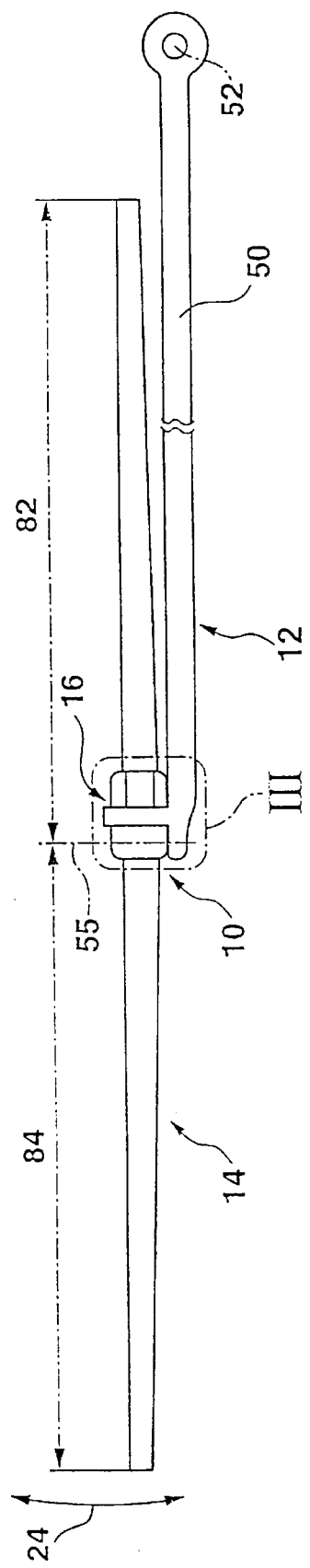
FIG. 2 shows a top view of the wiper apparatus with the wiper blade according to FIG. 1.

A wiper apparatus 10 for motor vehicle windshields, shown in FIG. 2, comprises a driven wiper arm 12 located on the motor vehicle body, with a wiper blade 14 linked to its free end. The articulated linkage between wiper arm 12 and wiper blade 14 consists of an appropriately made connecting device 16. Wiper arm 12 and thus also wiper blade 14 are stressed in the direction of arrow 18 [sic—"arrow 18" is not shown in the drawing—Translator] toward a motor vehicle windshield 20, indicated in FIG. 1 by a dash-dot line, with which an elongated, elastic wiping strip 22 can be brought in contact. In the resulting operating position, the wiper blade is displaced over the windshield in the direction of the double arrow 24 (FIG. 2) to clean the surface 28 thereof. In FIG. 1, however, wiper blade 14 is shown in a position in which only its two ends touch windshield 20. Wiping strip 22 of wiper blade 14 is disposed parallel to the longitudinal axis on the side of strip 25, facing windshield 20, of a one-part strip-like carrying element 26. On the other side of strip 27 of carrying element 26, facing away from windshield 20, is fastened on the wiper blade side, in the center portion thereof, a device part 30 belonging to connecting device 16. As can be seen from FIG. 1, the wiper blade in its represented position in which it does not yet touch windshield 20 in its entire length is more strongly curved than is the windshield. Because FIG. 1 shows the strongest curvature of windshield surface 28, it is clearly evident that the curvature of wiper blade 14 touching windshield 20 with both its ends is greater than the maximum windshield curvature. Under the applied pressure (arrow 18), the wiper blade along its entire length touches with its wiping lip 32 the windshield surface 28 to be wiped. This produces in the elastic carrying element 26 a tension which provides for appropriate contact between the entire length of wiping strip 22, or of wiping lip 32, and windshield 20. Because the windshield, which normally is curved in spherical fashion, is not a segment of a spherical surface, wiper blade 14, unlike wiper arm 12, must at all times during its wiping motion (double arrow 24) be able to adapt itself to the particular position of the windshield. For this reason, connecting device 15 [sic—"connecting device 16" seems to be meant—Translator] is designed also as an articulated connection between wiper blade 14 and wiper arm 12.

In the following, two embodiment examples of the connection between the wiper blade and the wiper arm will be described in greater detail. As can be seen from FIG. 3, wiper blade 14 is provided with a one-part, strip-like carrying element 26. In the center portion of the wiper blade shown here is located on the side of the wiper blade the device part, or coupling part, 30 with the aid of which wiper arm 12 can be connected with wiper blade 14 in an articulated manner. Device part 30 which in this embodiment example is made of plastic is rigidly connected with the wiper blade or the carrying element 26 thereof. It has a block-shaped section 34 in which is disposed a bearing bore 36 in the form of a blind hole. Bearing bore 36 is located in the block-shaped section 34 of the connecting part, near one of the longitudinal ends thereof. At the other longitudinal end is connected to section 34 of device part 30 a groove 38 oriented transverse to the longitudinal direction of wiper blade 14, said groove at its top being open toward the side facing away from carrying element 26. End section 40, which toward the other end of device part 30 is in the proximity of cross groove 38, is also shaped like a block, but is not as high as section 26 with bearing bore 36. From this it follows that the height of section 34 of device part 30 is the greatest relative to the upper side 27 of carrying element 26. In FIG. 11, this height is indicated by reference number 42. The height of device part 30 is smallest in the region of cross groove 38 or of the groove bottom. This height is indicated in FIG. 12 by reference number 44. The height of section 40 corresponds to height 42 of section 34 in the embodiment example. It is also quite possible to retain height 44 from the groove region over section 40 of device part 30 so that instead of groove 38 a shoulder is formed. Moreover, device part 30 is provided in the region of its section 40 beyond cross groove 38 with inclined surfaces 46. Inclined surfaces 46, however, are sized so that side cheeks 48 are retained over the entire length of device part 30 on both of its longitudinal sides which face each other and which extend from section 34 beyond cross groove 38 to the end of section 40 of device part 30 (FIG. 3).

Figure 3:
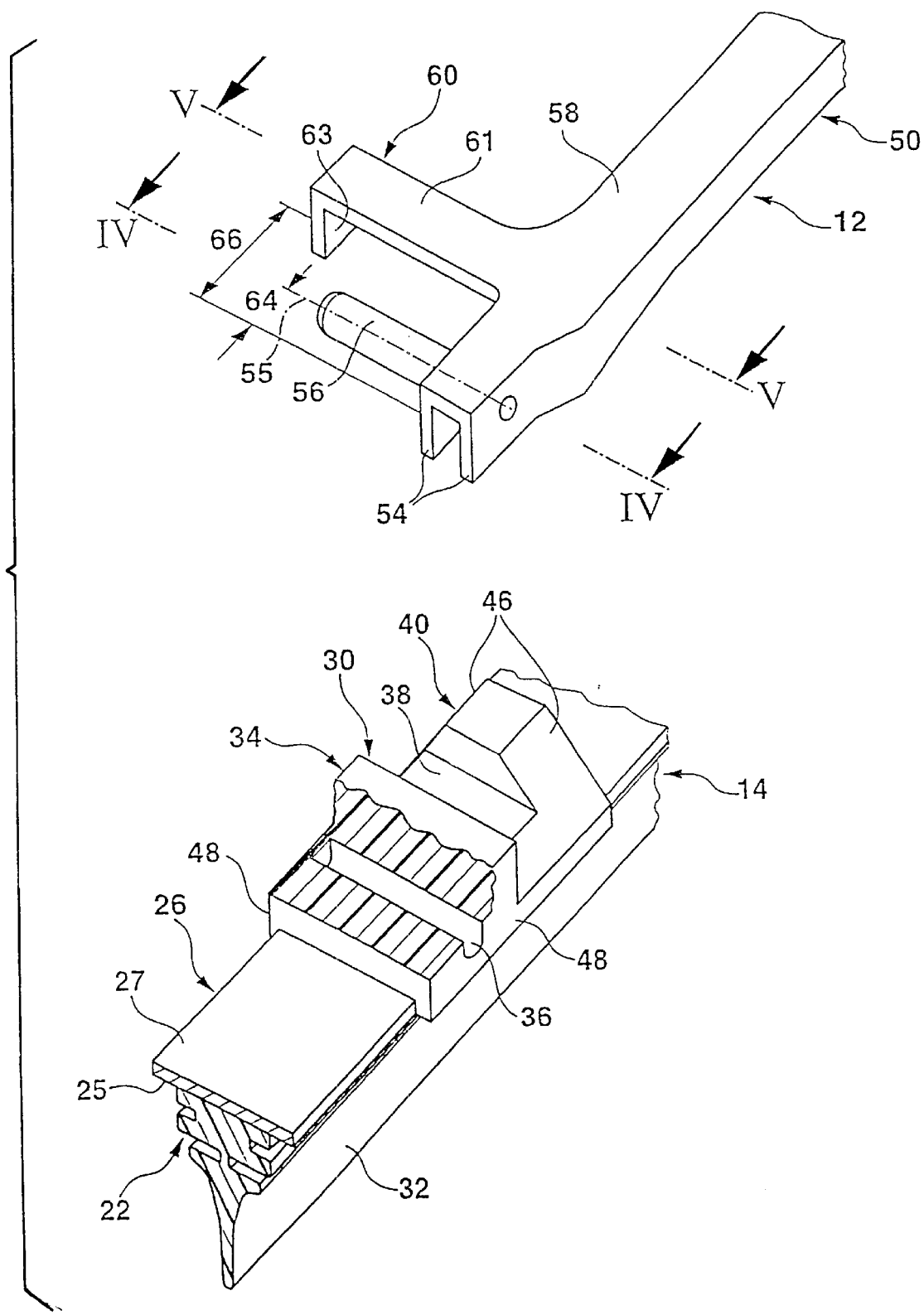
FIG. 3 is a representation in perspective of a magnified detail of the wiper apparatus of FIG. 2, indicated by III.

Moreover, FIG. 3 shows the free end on the connection side of wiper arm 12 which free end in this embodiment is in the form of a non-cutting sheet metal part. It has a swiveling lever 50 extending from a bearing location 52 (FIG. 2) on the motor vehicle body and has a U-shaped cross-section, at least over large regions. The U-legs 54 of swiveling lever 50 are oriented toward the windshield 20 to be wiped. Close to its free end which is located away from bearing location 52, the swiveling lever is provided with a joint pin 56 which has a smooth surface and whose axis 55 extends essentially in the direction of the wiper arm motion (double arrow 24 in FIG. 2). The diameter of joint pin 56 is adapted to the diameter of the bearing bore 36 in device part 30 in a manner ensuring a virtually play-free, smooth fit which allows an unhindered swinging motion of wiper blade 14 about axis 55 of joint pin 56. As can also be seen from FIG. 3, the U-base 58 of swiveling lever 50 extends with an L-shaped shoulder 60 outward beyond one U-leg 54, the one L-leg 61 connected with U-base 58 being oriented transverse to the extension of swiveling lever 50. The other L-leg 62 [sic—Translator] is oriented toward windshield 20. Distance 64 from the free end of wiper blade 12 or swiveling lever 50 to joint axis 55 is smaller than the distance 66 from the free end of the wiper arm or swiveling lever 50 to the L-shaped shoulder 60.

When, as in FIG. 3, wiper blade 14 is to be attached to the connection end of wiper arm 12 (FIG. 3), wiper arm 200 must first be brought into a position—deflected from windshield 20 in the direction opposite to that of arrow 65 [sic—Translator]—as shown in FIG. 9. Moreover, as shown in FIG. 9, wiper blade 14 must then assume the position relative to the wiper arm in which the L-leg 62 of the L-shaped shoulder 60 belonging to wiper arm 12 assumes the position, seen in FIG. 9, relative to cross groove 38 of the device part 30 belonging to wiper blade 14. It is necessary to ensure an appropriate adaptation of the distance from the joint axis to the two side walls of the groove on one side to the distance from the joint axis to the side edges of one L-leg 61 connected to swiveling lever 50 of wiper arm 12. When the mounting position between wiper arm 200 and wiper blade 14, represented in FIG. 9, is realized, wiper blade 14 can be pushed in the direction of joint axis 55 onto joint pin 56 of the wiper arm until side cheek 48 presenting the opening of bearing bore 36 touches the wiper arm or a rigid shoulder of the wiper arm. In this intermediate mounting position, wiper blade 14 can be turned relative to wiper arm 200 in the direction of arrow 86 (FIG. 9) as shown in FIG. 10. The wiper arm can then also be swung back in the direction of arrow 85 (FIG. 9) and thus brought into its operating position in which wiper blade 14 closely conforms to the surface 28 of windshield 20 to be wiped (FIG. 10). The relative movement between the wiper arm and the wiper blade is possible because distance 68 (FIG. 12) between the inner side of leg 62 facing wiper arm 12 is adapted to a length 70 which on the wiper blade or, in the embodiment example, on device part 30 is measured in the direction of joint axis 55. Here, the two Measuring sites must not necessarily face each other. In the embodiment example, one measuring region 72 is on the side cheek 48 of device part 30 which when the wiper blade is mounted on the wiper arm is in direct proximity to the inner side of L-leg 62. The other measuring region 74, in the embodiment example shown in FIG. 11, is formed by the collar 76 of a bearing bushing 78 the bore of which takes over the bearing function for joint pin 56 and which, in turn, rests firmly in device part 30. Here, the front face 80 of collar 76 serves as the reference point for measuring region 74.

In the configuration of device part 30 according to FIG. 3, the measuring sites for length 70 are formed by the two long sides or side cheeks 48 of device part 30 itself. It is important that in the operating position of the wiper apparatus shown in FIGS. 11 and 12 the one side cheek 48 of the wiper blade, or the measuring regions 72 and 74 of the wiper blade, faces directly the inner side 63 of L-leg 62 or measuring region 75 for the distance 68 on wiper arm 12. L-leg 62 or its inner wall 63 facing the wiper arm, together with the measuring site 75 that faces said inner wall, forms on the wiper arm support regions which are located at a distance 68 from one another in the wiping direction and are oriented toward one another. Between these support regions 63 and 75 of the wiper arm lie matching regions 72, 74 of the wiper blade, said regions facing away from one another and being formed by the front face 80 of collar 76 or on the side cheeks 48 of device part 30.

It can be seen from FIGS. 2 and 3 that, measured in the longitudinal direction of wiper blade 14, the distance 82 of the bearing bore or of the joint axis 55 over the cross groove 38 to one end of the wiper blade is greater than the distance 84 from joint axis 55 to the other end of the wiper blade. Because the center of gravity is thus fixed and displaced toward one end of the wiper blade, when the wiping apparatus 10 swings away from windshield 20 in the direction opposite to arrow 85 in FIG. 9, a moment is created which turns the wiper blade about the joint axis 55 in the direction of arrow 86 so that said blade with the side cheeks 48 of device part 30 always remains between the securing means 63, 75 of wiper arm 1 2 and is thus protected against inadvertent separation of the wiper arm.

The necessarily specified operating location of wiper blade 14 between the securing means of the wiper arm avoids erroneous mounting with certainty, because otherwise the visually clearly recognizable operating position between wiper arm and wiper blade cannot be attained.

The use of bearing bushing 78 in place of blind hole 36 shown in FIG. 3 has advantages in terms of the adaptation of the sliding partners.

Note regarding the configuration according to FIGS. 11 and 12 that here the wiper blade is not provided with a one-piece carrying element, but that said element consists of two part rails 102 which rest in longitudinal grooves 104 of wiping strip 106 [sic—Translator]. Part rails 102 are secured in their longitudinal grooves 104 by the fact that device part 30 overlaps and grips from below in claw-like fashion the longitudinal edges of the part rails, which rails face away from each other. Moreover, FIGS. 4, 5, 11 and 12 show that in a wiper arm 12 made of sheet metal and having a U-shaped cross-section whose U-leg 54 is oriented toward windshield 20, joint pin 56 passes through the U-leg 54 in a recess 108 in proximity to wiper blade 14 and is fastened, preferably riveted or welded, to the other U-leg 54.

In another embodiment of the wiper arm 12 shown in FIGS. 6 to 10, said arm is provided at its free end with a separate connecting piece 202 made by casting or injection-molding, which has both joint pin 204 and securing part 208 for the wiper blade. In this case, the joint pin is molded to the massive end piece 206 of the wiper arm. In this embodiment, it is clear that the L-shaped shoulder 208 is molded directly onto connecting piece 202. The arrangement and configuration of joint pin 204 and of the L-shaped shoulder 208 per se and relative to one another are entirely equivalent to the embodiment of the invention explained by reference to FIGS. 3 and 12.

To improve the guidance of the wiper blade on the wiper arm and to reduce the load on bearing means 36 or 56 of the wiper arm and the wiper blade, it may be advantageous to fittingly adapt to each other the width of one L-leg 61, measured in the longitudinal direction of the wiper arm, and the width of cross groove 38.

The two embodiment examples have in common the feature that the securing means for wiper blade 14 are disposed on wiper arm 12 and that on the side of the wiper blade facing away from the wiper arm said means cooperate with a stop on the wiper blade side, said stop being formed by the inner wall of the other L-leg 62. It is clear that the securing of the wiper blade on the joint pin toward the other side is taken over by the wiper arm itself, because the joint pin is fastened to this wiper arm.

What is claimed is:

1. Wiper apparatus (10) for motor vehicle windshields, with an elongated driven wiper arm (12) located on a motor vehicle body, movable between reversing positions, on a free end of said arm is fixed on one end of a cantilevered joint pin (56) with a joint axis (55) extending transverse to the longitudinal axis of the wiper arm and essentially in the direction of movement of the wiper arm, on said joint pin being mounted a wiper blade (14) capable of swinging about the joint axis (55), said blade having spaced sides with said arm lying on one of said sides the wiper apparatus having means for securing the wiper blade on the joint pin (56), characterized in that the securing means (60) are disposed on the wiper arm (12) and extending therefrom and that on the other side of the wiper blade (14) facing away from said wiper arm said means cooperate with a stop (62, 63) located on the other side of the wiper blade.

2. Wiper apparatus according to claim 1, characterized in that the wiper blade (14) has a strip-shaped, elongated carrying element (26), made of an elastic material, for a wiping strip (22) coming in contact with the windshield (20) to be wiped, on whose strip-like surface (27) facing away from the windshield is disposed a coupling part (30) belonging to a connecting device (16) and having a bearing recess (36) for the joint pin (56).

3. Wiper apparatus according to claim 1, characterized in that the securing means (63, 75) of the wiper arm (12) are formed by supporting regions (62, 75) located on said arm and disposed in the wiping direction (double arrow 24) at a distance from one another and oriented toward each other, between which regions are disposed matching regions (48 or 80) of the wiper blade (14) which face away from each other.

4. Wiper apparatus according to claim 3, characterized in that one supporting region (75) is disposed on a swiveling lever (50) of the wiper arm (12) and that the swiveling lever has a shoulder (60) which projects in the direction of the extension of the joint axis (55) and which crosses the wiper blade, on the free end of said shoulder being disposed a leg (62) oriented toward the windshield, the side (63) of said leg that faces the swiveling lever forming the other supporting region.

5. Wiper apparatus according to claim 4, characterized in that the distance (64) from the free end of the wiper arm to the joint axis is less than the distance (66) from the free end of the wiper arm to the shoulder (60).

6. Wiper apparatus according to claim 5, characterized in that, seen in the longitudinal direction of the wiper blade (14), the bearing bore (36) is disposed in the coupling part (30) near one end thereof and that, at least in the region of the shoulder (60) and relative to the carrying element (26), the coupling part is lower than in the region of the bearing bore (38).

7. Wiper apparatus according to claim 6, characterized in that the coupling part (30) in the region of the shoulder (60) disposed on the wiper arm is provided with a cross groove (38) having an upper side that faces away from the carrying element (26) and in which groove the shoulder (60) crosses the coupling part (30).

8. Wiper apparatus according to claim 7, characterized in that, measured in the longitudinal direction of the wiper blade (14), the distance (82) of the bearing bore (36) over the cross groove (38) to one end of the wiper blade (14) is greater than the distance to the other end of the wiper blade.

9. Wiper apparatus according to claim 7, characterized in that the matching regions (72, 74) of the wiper blade (14) are formed on the two mutually facing longitudinal sides (48) of the coupling part (30).

10. Wiper apparatus according to claim 9, characterized in that, measured in the direction of the joint axis (55), the distance (70) between the matching regions of the wiper blade is adapted to the distance (68) between the supporting regions (63, 75) of the wiper arm.

11. Wiper apparatus according to claim 7, characterized in that, measured in the longitudinal direction of the wiper blade, the width of the shoulder (60) is adapted to the width of the cross groove (38).

12. Wiper apparatus according to claim 1, characterized in that, at least in the region of the joint pin (56), the wiper arm has a U-shaped cross-section, whose U-legs (54) are oriented toward the windshield (20), and that the joint pin (56) passes through the U-leg in a recess (108) in proximity to the wiper blade and is fastened to the other U-leg (54).

13. Wiper apparatus according to claim 1, characterized in that at least one section (202) of the wiper arm (200) is a part made by injection molding and that the joint pin (204) at said one end is molded to the wiper arm.

14. Wiper apparatus according to claim 1, characterized in that a separate connection piece (202) is attached to the free end of the wiper arm, said connection piece having both the joint pin (204) and the securing means (208) for the wiper blade (14).

* * * * *